United States Patent
Cobb et al.

(10) Patent No.: US 9,373,055 B2
(45) Date of Patent: Jun. 21, 2016

(54) HIERARCHICAL SUDDEN ILLUMINATION CHANGE DETECTION USING RADIANCE CONSISTENCY WITHIN A SPATIAL NEIGHBORHOOD

(75) Inventors: Wesley Kenneth Cobb, The Woodlands, TX (US); Kishor Adinath Saitwal, Houston, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 2194 days.

(21) Appl. No.: 12/336,382

(22) Filed: Dec. 16, 2008

(65) Prior Publication Data
US 2010/0150471 A1 Jun. 17, 2010

(51) Int. Cl.
*H04N 7/50* (2006.01)
*G06K 9/46* (2006.01)

(52) U.S. Cl.
CPC .................... *G06K 9/4661* (2013.01)

(58) Field of Classification Search
CPC .......... G06K 9/00771; G06K 9/00765; G06K 9/4661; G06T 2201/20144; G06T 7/0081; G06T 7/2053; H04N 5/147
USPC ...................... 375/240.16; 382/173, 174, 190; 725/135
See application file for complete search history.

(56) References Cited

U.S. PATENT DOCUMENTS

| | | |
|---|---|---|
| 4,679,077 A | 7/1987 | Yuasa et al. |
| 5,113,507 A | 5/1992 | Jaeckel |
| 5,748,775 A * | 5/1998 | Tsuchikawa ....... G06K 9/00369 375/E7.083 |
| 5,751,378 A | 5/1998 | Chen et al. |
| 5,969,755 A | 10/1999 | Courtney |
| 6,252,974 B1 | 6/2001 | Martens et al. |
| 6,263,088 B1 | 7/2001 | Crabtree et al. |
| 6,570,608 B1 | 5/2003 | Tserng |
| 6,661,918 B1 | 12/2003 | Gordon et al. |
| 6,674,877 B1 | 1/2004 | Jojic et al. |
| 6,678,413 B1 | 1/2004 | Liang et al. |
| 6,856,249 B2 | 2/2005 | Strubbe et al. |
| 6,940,998 B2 | 9/2005 | Garoutte |
| 7,076,102 B2 | 7/2006 | Lin et al. |
| 7,136,525 B1 | 11/2006 | Toyama et al. |
| 7,158,680 B2 | 1/2007 | Pace |

(Continued)

FOREIGN PATENT DOCUMENTS

WO 200949314 A2 4/2009

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

(Continued)

*Primary Examiner* — Mehrdad Dastouri
*Assistant Examiner* — Obafemi Sosanya
(74) *Attorney, Agent, or Firm* — Patterson & Sheridan, LLP

(57) ABSTRACT

Techniques are disclosed for detecting sudden illumination changes using radiance consistency within a spatial neighborhood. A background/foreground (BG/FG) component of a behavior recognition system may be configured to generate a background image depicting a scene background. Further, the (BG/FG) component may periodically evaluate a current video frame to determine whether a sudden illumination change has occurred. A sudden illumination change occurs when scene lighting changes dramatically from one frame to the next (or over a small number of frames).

25 Claims, 7 Drawing Sheets

(56) References Cited

U.S. PATENT DOCUMENTS

| | | | |
|---|---|---|---|
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,825,954 B2 | 11/2010 | Zhang et al. | |
| 7,868,912 B2 | 1/2011 | Venetianer et al. | |
| 2003/0107650 A1 | 6/2003 | Colmenarez et al. | |
| 2003/0228058 A1* | 12/2003 | Xie | G08B 13/19604 382/218 |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0138338 A1* | 6/2006 | Tezuka | G01N 21/47 250/372 |
| 2006/0165386 A1 | 7/2006 | Garoutte | |
| 2006/0190419 A1 | 8/2006 | Bunn et al. | |
| 2006/0193516 A1* | 8/2006 | Toyama | G06K 9/38 382/173 |
| 2006/0222206 A1 | 10/2006 | Garoutte | |
| 2007/0250898 A1* | 10/2007 | Scanlon | G06K 9/00771 725/135 |
| 2008/0002856 A1 | 1/2008 | Ma et al. | |
| 2008/0181453 A1 | 7/2008 | Xu et al. | |
| 2008/0181499 A1* | 7/2008 | Yang | G06T 7/0083 382/174 |
| 2008/0193010 A1 | 8/2008 | Eaton et al. | |
| 2008/0240496 A1 | 10/2008 | Senior | |
| 2008/0247599 A1* | 10/2008 | Porikli | G06K 9/00771 382/103 |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |
| 2010/0322516 A1* | 12/2010 | Xu | G06K 9/00778 382/173 |

OTHER PUBLICATIONS

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

\* cited by examiner

HIERARCHICAL SUDDEN ILLUMINATION CHANGE DETECTION USING RADIANCE CONSISTENCY WITHIN A SPATIAL NEIGHBORHOOD

BACKGROUND OF THE INVENTION

1. Field of the Invention

Embodiments of the invention provide techniques for computationally analyzing a sequence of video frames. More specifically, embodiments of the invention relate to techniques for detecting sudden illumination changes using radiance consistency within a spatial neighborhood.

2. Description of the Related Art

Some currently available video surveillance systems provide simple object recognition capabilities. For example, some currently available systems are configured to identify and track objects moving within a sequence of video frame using a frame-by-frame analysis. These systems typically acknowledge the need to isolate foreground images from background images (i.e., for identifying portions of a scene that depict activity (e.g., people, vehicles, etc.) and portions that depict fixed elements of the scene (e.g., a road or a subway platform). The background essentially provides a stage upon which activity occurs. Contiguous regions of the scene that contain a portion of scene foreground (referred to as a foreground "blob") are identified, and a given "blob" may be matched from frame-to-frame as depicting the same object. That is, the "blob" is tracked as it moves from frame-to-frame within the scene. To be effective, a video surveillance system needs to be able to detect and follow objects within a scene in a quick and efficient manner as the video is captured at a real-time frame rate. Once identified, a "blob" may be tracked from frame-to-frame in order to follow the movement of the "blob" over time, e.g., a person walking across the field of vision of a video surveillance camera.

Further, such systems may be able to determine when an object has engaged in certain predefined behaviors. However, such surveillance systems typically require that the objects and/or behaviors which may be recognized by the system to be defined in advance. Thus, in practice, these systems simply compare recorded video to predefined definitions for objects and/or behaviors. In other words, unless the underlying system includes a description of a particular object or behavior, the system may not recognize that behavior (or at least instances of the pattern describing the particular object or behavior). Thus, to recognize additional objects or behaviors, separate software products may need to be developed. This results in surveillance systems with recognition capabilities that are labor intensive and prohibitively costly to maintain or adapt for different specialized applications. Further still, such systems are often unable to associate related aspects from different patterns of observed behavior. As a result, by restricting the range of objects that a system may recognize using a predefined set of patterns, many available video surveillance systems have been of limited usefulness.

SUMMARY OF THE INVENTION

Embodiments of the invention relate to techniques for detecting sudden illumination changes using radiance consistency within a spatial neighborhood. One embodiment of the invention provides a computer-implemented method for detecting a sudden illumination change (SIC) in a sequence of video frames. The method may generally include receiving a current video frame, of the sequence of video frames and identifying one or more sets of pixels in the current video frame, wherein each set of pixels is classified as depicting a foreground object. For each pixel in at least one of the sets of pixels, a radiance value is identified for both the pixel and for each pixel within a spatial neighborhood of the pixel. Further, it may be determined, for the pixel, whether the radiance values for the pixel and the pixels in the spatial neighborhood indicate that a sudden illumination change has occurred in a scene depicted by the sequence of video frames. Upon determining that a majority of pixels in a first one of the sets of pixels indicate that a sudden illumination change has occurred, reclassifying the pixels in the first set of pixels as depicting a background of the scene depicted by the sequence of video frames.

In a particular embodiment, the method may further include updating a set of pixels in a background image of the scene corresponding to the pixels in the first set of pixels. The spatial neighborhood for a given pixel may be defined as a 3×3 grid of pixels with the given pixel in the center of the 3×3 grid.

Further, the step of determining, for the pixel, whether the radiance values for both the pixel and the pixels in the spatial neighborhood indicate that a sudden illumination change has occurred may include identifying, in a background image, a pixel corresponding to the pixel in the current video frame and determining an intensity difference between the corresponding pixel and each pixel in a spatial neighborhood of the corresponding pixel. The determining step may also include determining an intensity difference between the pixel and each pixel in the spatial neighborhood of the pixel in the current video frame and normalizing the intensity differences determined between the pixel and each pixel in the spatial neighborhood of the pixel in the current video frame. The determining step may also include determining an absolute difference between each respective pixel in the spatial neighborhood of the pixel in the current video frame and each respective pixel in the spatial neighborhood of the corresponding pixel.

Further, for each pixel in the spatial neighborhood of the pixel in the current video frame, it may be determined whether the absolute difference is below a first specified threshold. If so, a counter representing how many pixels in the spatial neighborhood are below the first specified threshold may be incremented. Further, still upon determining the counter exceeds a second threshold, a status of the pixel may be set as being an SIC candidate pixel, indicating that the pixel was classified as depicting a scene foreground object due to a sudden illumination change in the scene depicted by the sequence of video frames (i.e., indicating that changes in radiance value for the pixel are may be due to a sudden illumination change).

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
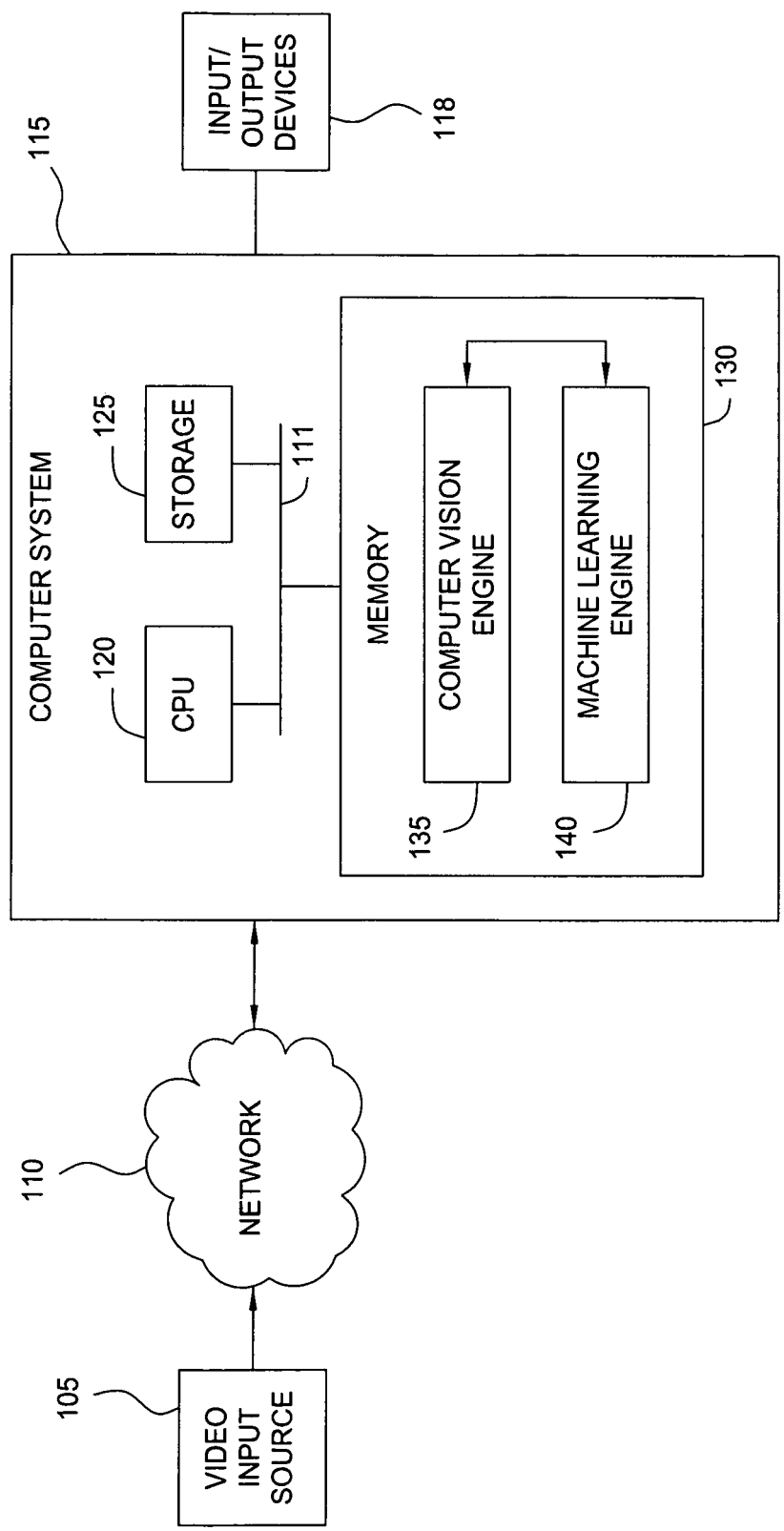
FIG. 1 illustrates components of a behavioral recognition system, according to one embodiment of the present invention.

A behavior-recognition system may be configured to learn, identify, and recognize patterns of behavior by observing events captured by a sequence of video frames. The behavior-recognition system may include both a computer vision engine and a machine learning engine. The computer vision engine may be configured to receive and evaluate a stream of individual video frames. Each frame typically provides a two-dimensional array of radiance values (e.g., a gray scale value between 0-255 or a set of RGB color channels values, each between 0-255). In one embodiment, the computer vision engine may generate a background image by observing the scene over a number of video frames. The background image represents the static, relatively permanent elements of a scene being observed by a video camera. Such an image may specify a pixel value representing a pixel value expected to be obtained when the scene background is visible to the camera for each pixel of the scene.

For example, consider a video camera trained on a stretch of a highway. In such a case, the background would include the roadway surface, the medians, any guard rails or other safety devices, and traffic control devices, etc. Vehicles traveling on the roadway (and any other person or thing engaging in some activity) would represent scene foreground objects. The computer vision engine could observe such a scene and, over time, develop a model or image of what the scene looks like in the absence of any foreground objects (i.e., an image of the highway without any vehicles or other activity).

In one embodiment, the background image allows the computer vision engine to identify when a foreground object enters (or appears) in the scene. For example, as a vehicle enters the field-of-vision of the camera, a pixel value depicting a part of the car may be sufficiently different from the corresponding pixel in the background image for the computer vision engine to conclude that the background represented by that pixel has been occluded by a foreground object. As the vehicle occludes more and more pixels, the computer vision engine may identify the "blob" of pixels as a depicting part of a common foreground object and attempt to track its position from frame to frame. For example, the position and kinematics of the car determined from one frame (or frames) may be used to predict a future position of the car in subsequent frames.

In some cases, a background image may be generated using a rolling average of pixel values. For example, the value for a given pixel in the background image may be a weighted average of that pixel determined over X number of frames. Once an initial background image is generated, it may be updated using values for pixels in a current image, when such pixels are not believed to depict a foreground object. Doing so helps account for camera noise (i.e., for changes in pixel value from frame-to-frame introduced by the camera and not changes in the scene) and also allows for the background image to be updated to reflect gradual changes in lighting over time. For example, returning to the example of a camera trained on a highway, gradual lighting changes caused by movement of the sun or by changes in cloud cover may be reflected in the background image. Thus, from frame-to-frame, small differences in pixel values between a pixel in a current frame and the corresponding pixel in the background image may not result in the computer vision engine concluding that the pixel depicts a foreground object and such changes may help maintain of the accuracy of the background image.

However, sudden lighting changes present different challenges. A sudden lighting change occurs when the illumination of the scene changes dramatically from one frame to the next (or over a small number of frames). A sudden lighting change occurring in some region of the scene may lead the computer vision engine to conclude that a new foreground object has appeared. A variety of events may result in a sudden lighting change. For example, the headlights of a car traveling on the roadway may illuminate portions of the road surface or other portions of scene background, resulting in dramatic changes in pixel values. A break in the clouds may result in a sudden illumination change where a large portion of the scene not illumined with direct sunlight in one frame is brightly illuminated in the next (or vice-versa). Or more simply, a light source in the scene (e.g., a light along a roadside) switches on (or off). In such cases, portions of the scene classified as depicting a foreground object may actually depict a region of scene background, lighted differently. Thus, sudden illumination changes may contaminate the foreground models with false foreground objects.

Embodiments of the invention may be used as part of a computer vision engine to detect sudden illumination changes occurring in a sequence of video frames. This disclosure describes a background/foreground (BG/FG) component of a behavior recognition system configured to generate a background image depicting a scene background. Further, the (BG/FG) component may periodically evaluate a current video frame to determine whether a sudden illumination change has occurred. In one embodiment, sudden illumination changes may be detected using radiance consistency within a spatial neighborhood. That is, to determine whether a given pixel value in an image of video has undergone a sudden illumination change, the radiance values of pixels neighboring the given pixel are evaluated. The (BG/FG) component may evaluate the background image and foreground blobs derived from a current video frame to determine whether a sudden illumination change has occurred. If a majority of pixels of a foreground blob indicate that a sudden illumination change has occurred, such pixels may be classified as depicting background of the scene (and not scene foreground). Further, such pixels may be used to update the background image so that the pixel values in the background model reflect the sudden illumination change.

Data from output from the computer vision engine may be supplied to the machine learning engine. As events occur, and re-occur, the machine learning engine may create, encode, store, retrieve, and reinforce patterns representing the events observed to have occurred. Further still, patterns representing an event of interest may result in alert to a user of the behavioral recognition system.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 114 may transmit video data recorded by the video input 112 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine learning engine 140. As described in greater detail below, the computer vision engine 135 and the machine learning engine 140 may provide software applications configured to analyze a sequence of video frames provided by the video input 112.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

As described in greater detail below, the computer vision engine 135 may be configured to analyze this raw information to identify active objects in the video stream, classify the objects, derive a variety of metadata regarding the actions and interactions of such objects, and supply this information to a machine learning engine 140. In turn, the machine learning engine 140 may be configured to evaluate, observe, learn and remember details regarding events (and types of events) that transpire within the scene over time.

In one embodiment, the machine learning engine 140 receives the video frames and a set of numerical data generated by the computer vision engine 135. The machine learning engine 140 may be configured to analyze the received data, build semantic representations of events depicted in the video frames, detect patterns, and, ultimately, to learn from these observed patterns to identify normal and/or abnormal events. In one embodiment, data describing whether a normal/abnormal behavior/event has been determined and/or what such behavior/event is may be provided to output devices 118 to issue alerts, for example, an alert message presented on a GUI interface screen. In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 analyzes each frame in real-time to derive a set of information about what is occurring within a given frame, the machine learning engine 150 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 135 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application 250 running on another computer system may request (or receive) the results of over network 110.

Figure 2:
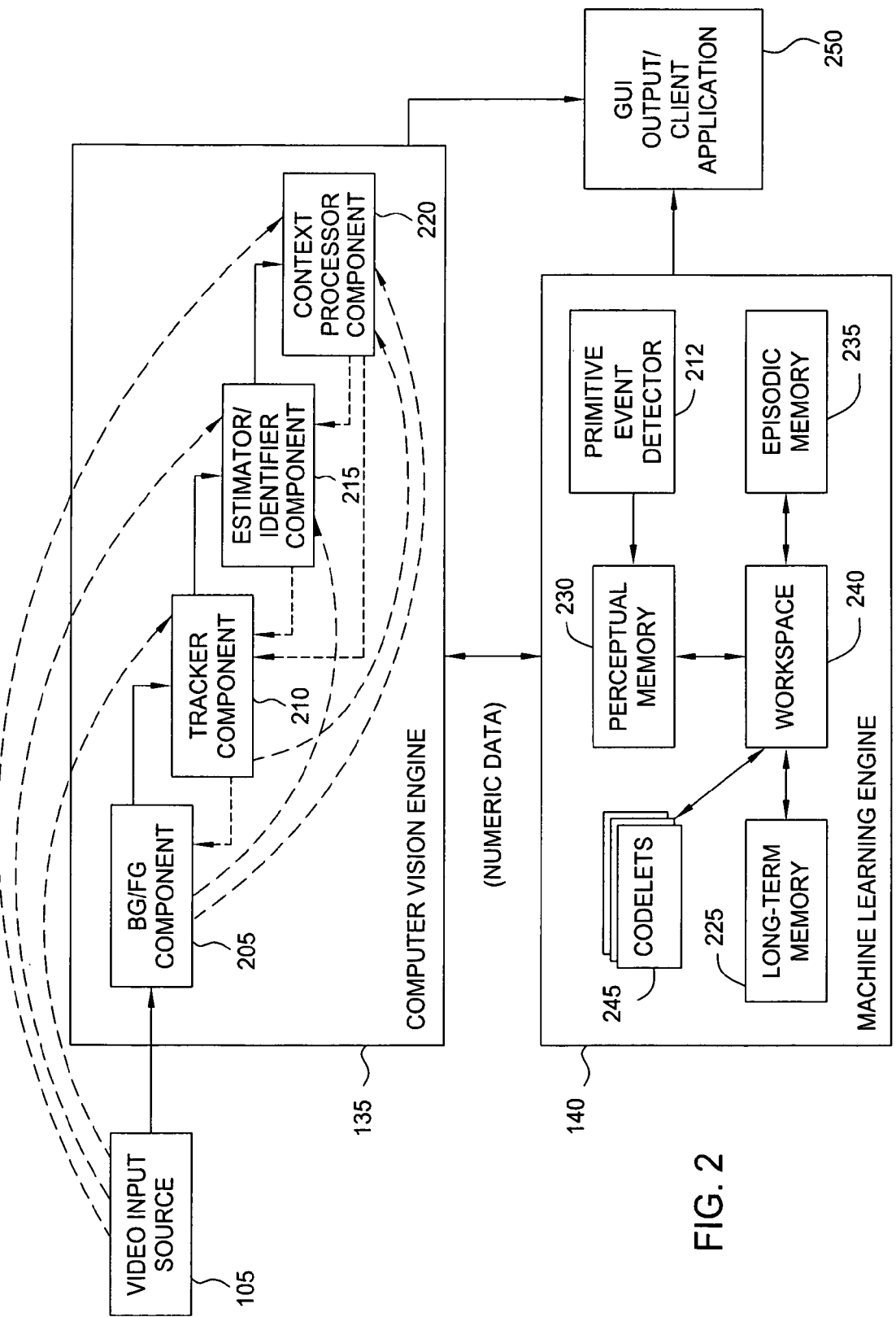
FIG. 2 further illustrates components of the behavioral recognition system shown in FIG. 1, according to one embodiment of the present invention.

FIG. 2 further illustrates components of the computer vision engine 135 and the machine learning engine 140 first illustrated in FIG. 1, according to one embodiment of the present invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows). In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case.

In one embodiment, the BG/FG component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channel or radiance channel for black and white video). The BG/FG component 205 may be configured to generate a mask used to identify which pixels of the scene have been determined to depict foreground and, conversely, which pixels have been determined to depict scene background. The BG/FG component 205 then identifies regions of the scene that contain a portion of scene foreground (referred to as a foreground "blob" or "patch") and supplies this information to subsequent stages of the pipeline. Additionally, portions of the scene determined to depict scene background maybe used to update pixel values in a background image modeling the scene. Further, as described in greater detail below, the BG/FG component 205 may periodically determine whether a sudden illumination change (SIC) has occurred and update the background image accordingly.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene.

The estimator/identifier component 215 may receive the output of the tracker component 210 (and the BF/FG component 205) and classify each tracked object as being one of a known category of objects. For example, in one embodiment, estimator/identifier component 215 may classify a tracked object as being a "person," a "vehicle," an "unknown," or an "other." In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sitting) or an indication of whether the person is carrying an object.

The context processor component 220 may receive the output from other stages of the pipeline (i.e., the tracked objects, the background and foreground models, and the results of the estimator/identifier component 215). Using this information, the context processor 220 may be configured to generate an annotated map of the scene segmented into spatially separated regions. The regions may be labeled as natural or man-made and sorted according to occluding region pairs (i.e., regions may be determined to be in front of (or behind) other regions).

The computer vision engine 135 may take the outputs of the components 205, 210, 215, and 220 describing the motions and actions of the tracked objects in the scene and supply this to the machine learning engine 140. In one embodiment, the primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context events component 211 estimates the kinematic data regarding the car's position and velocity. In such a case, this information is supplied to the machine learning engine 140 and the primitive event detector 212. In turn, the primitive event detector 212 may generate a semantic symbol stream providing a simple linguistic description of actions engaged in by the vehicle. For example, a sequence of primitive events related to observations of the computer vision engine 135 occurring at a parking lot could include formal language vectors representing the following: "vehicle appears in scene," "vehicle moves to a given location," "vehicle stops moving," "person appears proximate to vehicle" "person moves," "person leaves scene" "person appears in scene," "person moves proximate to vehicle," "person disappears," "vehicle starts moving," and "vehicle disappears." As described in greater detail below, the primitive event stream may be supplied to excite the perceptual associative memory 220.

Illustratively, the machine learning engine 140 includes a long-term memory 225, a perceptual memory 230, an episodic memory 235, a workspace 240 and codelets 235. In one embodiment, the perceptual memory 220, the episodic memory 225, and the long-term memory 230 are used to identify patterns of behavior, evaluate events that transpire in the scene, and encode and store observations. Generally, the perceptual memory 230 receives the output of the computer vision engine 135. The episodic memory 235 stores data representing observed events with details related to a particular episode, e.g., information describing time and space details related on an event. That is, the episodic memory 235 may include details describing "what and where" something occurred within a scene such as a particular vehicle (car A) moved to a location believed to be a parking space (parking space 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an adaptive resonance theory (ART) network and a sparse-distributed memory data structure.

Generally, the workspace 215 provides a computational engine for the machine learning engine 140. For example, the workspace 215 may be configured to copy information from the perceptual memory 230, retrieve relevant memories from the episodic memory 235 and the long-term memory 245, select and invoke the execution of one of codelets 245. In one embodiment, each codelet 235 is a software program configured to evaluate different sequences of events and to determine how one sequence may follow (or otherwise relate to) another (e.g., a finite state machine). More generally, the codelet may provide a small software program configured to find interesting patterns. In turn, the codelet may create, retrieve, reinforce, or modify memories in the episodic memory 225 and the long-term memory 230 (i.e., when a pattern is identified). By repeatedly scheduling codelets for execution, copying memories and percepts to/from the workspace 215, the machine learning engine 140 performs a cognitive cycle used to observe, and learn, about patterns of behavior that occur within the scene.

Figure 3:
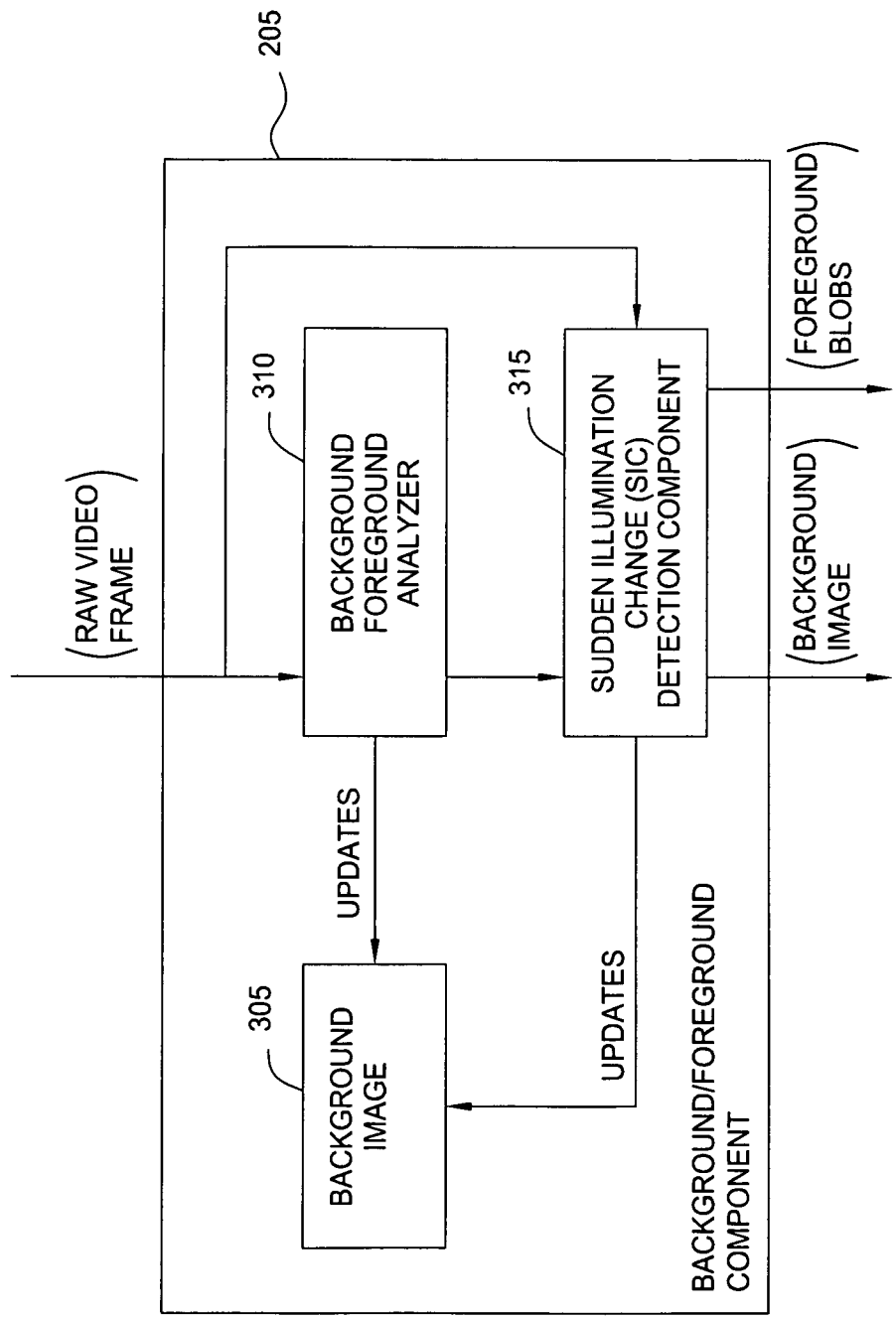
FIG. 3 illustrates an example of a background/foreground component of a computer vision engine configured to detect sudden illumination changes occurring in a sequence of video frames, according to one embodiment of the invention.

FIG. 3 illustrates an example of the background/foreground (BG/FG) component 205 of a computer vision engine 135 configured to detect sudden illumination changes occurring in a sequence of video frames, according to one embodiment of the invention. As shown, the BG/FG component 205 includes a background/foreground analyzer 310, a sudden illumination change (SIC) detection component 315, and a background image 305. Illustratively, the BG/FG component 205 receives input from the video source (e.g., a video camera) in the form of a raw video frame. And outputs a background image 305—representing the current model of the background of the scene—and also outputs a set of foreground blobs (or patches), each including a set of pixels believed to correspond to a foreground object depicted in the scene.

In one embodiment, the background/foreground analyzer 310 may provide a software module configured to generate background image 305 from a sequence of raw video frames. For example, the background/foreground analyzer 310 may initially use a set of sequential video frames as training data. In such a case, the background/foreground analyzer 310 may determine a value for a given pixel in the background image 305 by evaluating a value for that pixel in multiple images of raw video, e.g., an initial value for the pixel may be an average determined from the multiple images. More sophisticated approaches may include determining a statistical distribution of values for the pixel and determining an average value using only ones that fall within a particular range (e.g., within one standard deviation on either side of the median).

Once the background/foreground analyzer 310 generates an initial background image 350, subsequent frames of video may be used to update the pixel values in the background image 305. Further, the background/foreground analyzer 310 may be configured to evaluate a raw video frame using the background image 305 to identify a set of foreground patches. Typically, the pixel values in a raw video frame may be compared with the value for the corresponding pixels in the background image 305. If the values of the two pixels differ by a sufficient amount, then a given pixel may be classified as depicting part of a foreground object. The exact difference required for a pixel to be classified as foreground may be set as a matter of preference, e.g., as a relative change from frame-to-frame or a particular magnitude. Further, contiguous regions of pixels that differ from the background model may be classified as depicting a common object (evaluated by other portions of the computer vision engine). On the other hand, if a given pixel in the raw frame of video is classified as depicting scene background, then the value of that pixel may be used to update the corresponding value in the background image 305.

As shown, BG/FG component 205 also includes the SIC detection component 315. In one embodiment, the SIC detection component 310 may provide a software module configured to evaluate the current raw video frame (and foreground blobs) to determine whether a sudden illumination change has occurred. As stated, a sudden lighting change may occur when the illumination of the scene changes dramatically from one frame to the next (or over a small number of frames)—leading to portions of scene background to potentially be mischaracterized as depicting a foreground object due to changes in scene illumination.

In one embodiment, the SIC detection component 315 may operate every N seconds, where N is set as a matter of user preference. Additionally, the SIC detection component 315 may evaluate a given pixel relative to the radiance (e.g., grey scale values) of neighbors of that pixel in the raw image and the radiance of neighbors of the corresponding pixel in the background image. If a majority of a foreground blob are affected by a sudden illumination change, the SIC detection component 315 may update the foreground blobs and the background image 305. For example, pixels classified as depicting a foreground blob may be reassigned as depicting background, effectively deleting the blob from being evaluated as a foreground object by other components of the computer vision engine 135 or the machine learning engine 140. Additionally, the radiance value of such pixels may be used to update the background image 305—allowing the BG/FG component 205 to compensate for the sudden illumination change.

Figure 4:
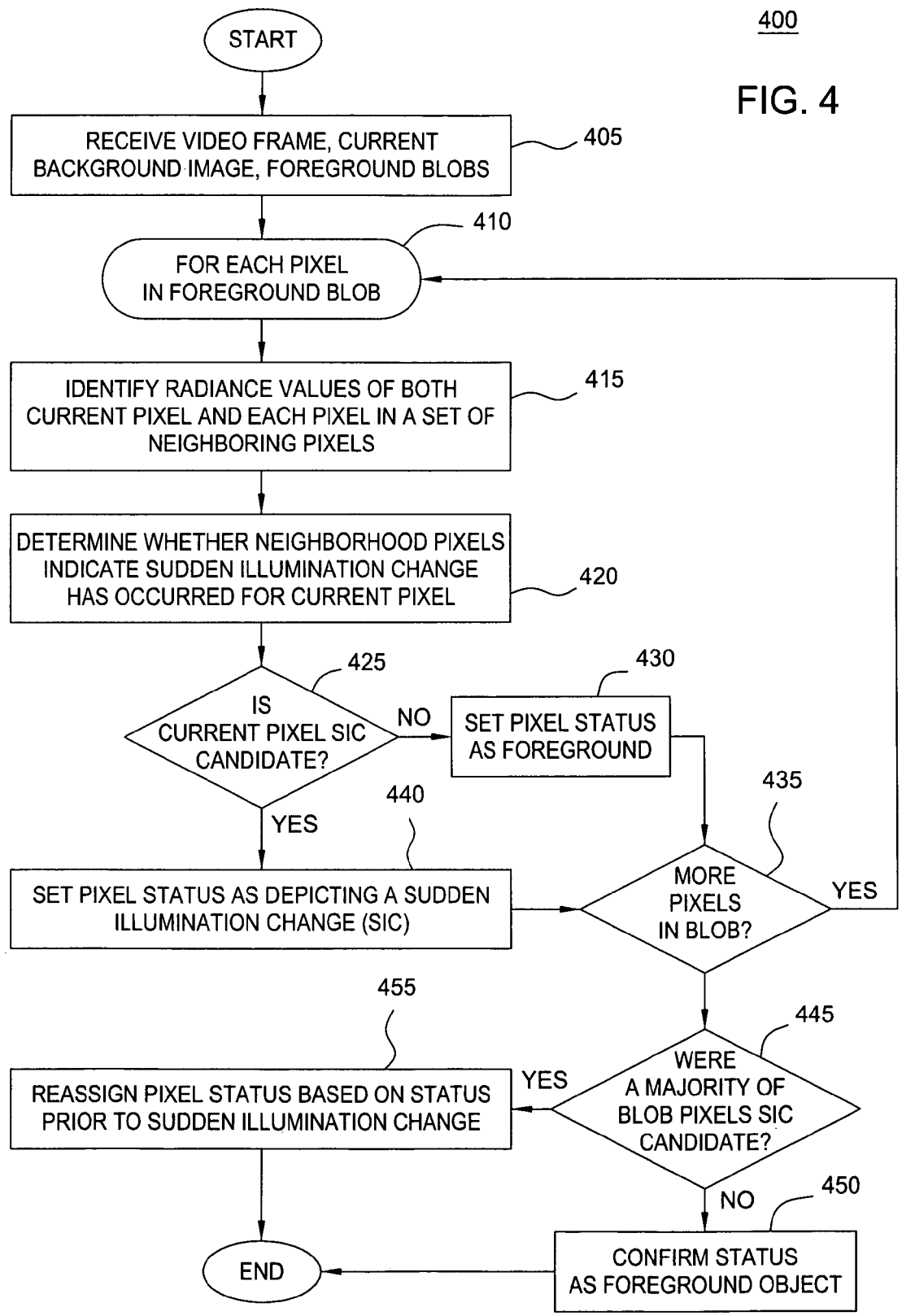
FIG. 4 illustrates a method for detecting sudden illumination changes in a sequence of video frames, according to one embodiment of the invention.

FIG. 4 illustrates a method 400 for detecting sudden illumination changes in a sequence of video frames, according to one embodiment of the invention. As shown, the method 400 begins at step 405 where the SIC detection component receives a current background image, along with a current video frame to evaluate for a sudden illumination change. In one embodiment, each pixel of the current video frame have been classified by the BG/FG component as depicting either scene background or a part of a foreground object.

At step 410, a loop beings to evaluate the pixels of a given foreground blob to identify whether a sudden illumination change has occurred. Once evaluated, if a majority of the pixels of that foreground blob indicate that a sudden illumination change has occurred, the SIC detection component may update the foreground blob and the background image accordingly. At step 415, the SIC detection component may identify values for a current pixel of a foreground blob as well as identify values for neighborhood pixels. As stated, the value for a given pixel may provide a radiance value (e.g., a grayscale value between 0 and 255). In one embodiment, the neighborhood places the current pixel at the center of a 3×3 grid, and the neighborhood includes the eight pixels surrounding the pixel at the center of the grid.

Figure 5:
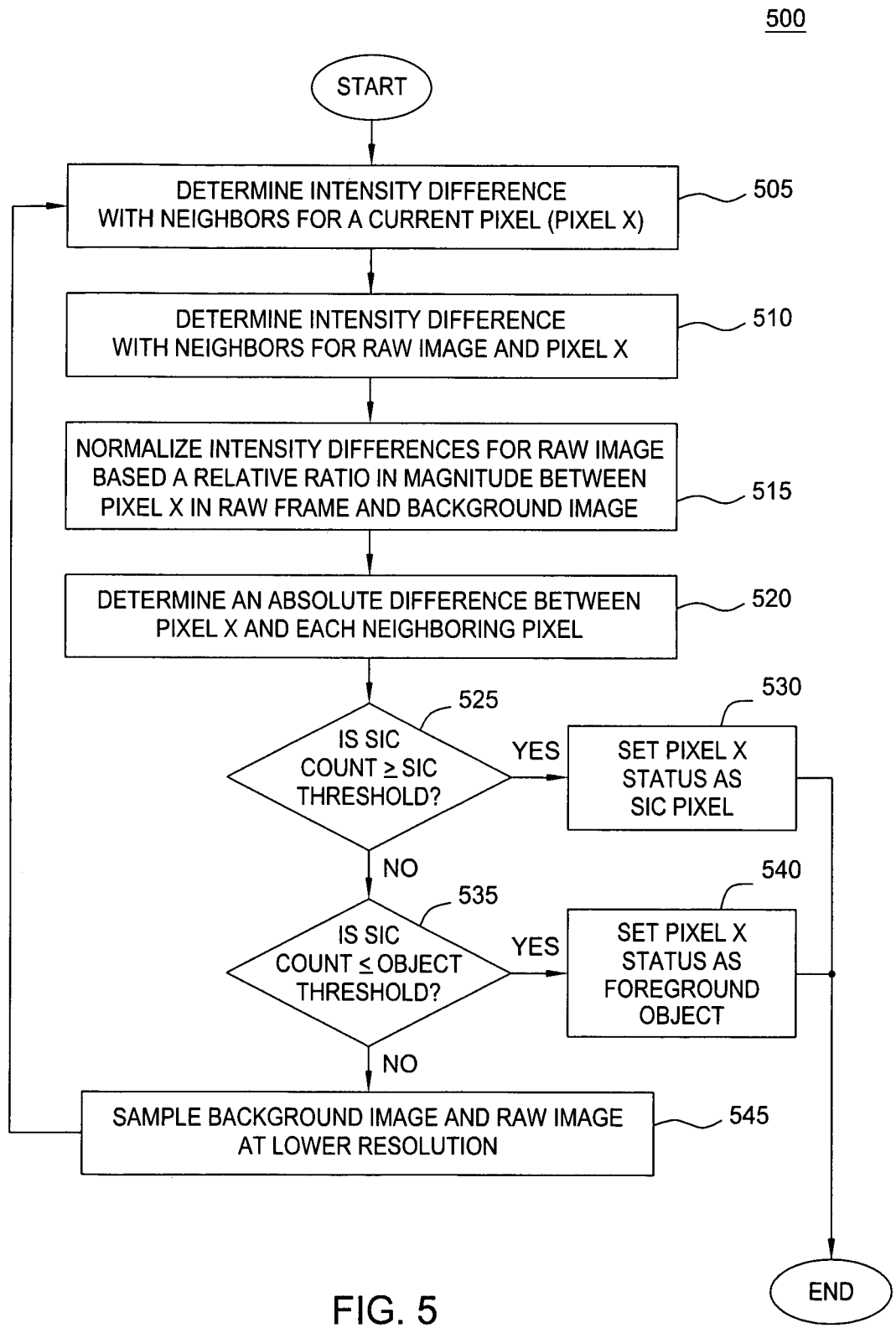
FIG. 5 illustrates a method for evaluating changes in pixel values using radiance consistency within a spatial neighborhood to detect sudden illumination changes, according to one embodiment of the invention.

At step 420, the SIC detection component may determine whether the values of the neighborhood pixels indicate that a sudden illumination change has occurred for the current pixel. FIG. 5, discussed below, describes an embodiment of the invention used to evaluate a pixel using radiance consistency within a spatial neighborhood (i.e., within the 3×3 grid). At step 425, if the radiance values of the neighborhood pixels do not indicate that the current pixel is a sudden illumination change (SIC) candidate, then a status for the current is set to indicate that the current pixel depicts a foreground object (step 430). That is, the status of the pixel as depicting a portion of a foreground object is confirmed. Otherwise, at step 440, the status of the current pixel is set to indicate that the current pixel is a SIC candidate, i.e., that the current pixel may have been classified as depicting a foreground object due to a sudden illumination change. At step 435, if more pixels in the foreground blob remain to be evaluated, the method returns to step 410 where the SIC detection component selects and evaluates another pixel.

Otherwise, at step 445, if a majority of pixels in the foreground blob have a status as an SIC candidate pixel, then at step 455, the pixels of the foreground blob are reverted to a prior status. For example, if a given pixel was classified as depicting scene background prior to the sudden illumination change, that pixel may be reclassified as being scene background in the current frame. Further, the current value of the pixel—reflecting the sudden illumination change—may be used to update a corresponding pixel in the background image. In one embodiment, a simple majority of pixels may be used to determine whether a foreground object is the result of a sudden illumination change. Of course, other thresholds may be used. At step 450, if a majority of blob pixels are not set to a status of SIC candidate, the status of the blob as a foreground object is confirmed. That is, the pixels in the blob are considered to depict an actual foreground object and not a part of scene background having undergone a sudden illumination change.

FIG. 5 illustrates a method 500 for evaluating changes in pixel values using radiance consistency within a spatial neighborhood to detect sudden illumination changes, according to one embodiment of the invention. The method 500 is described in conjunction with FIGS. 6A-6B, which illustrate two examples of pixel radiance values, one where a sudden illumination change has occurred (FIG. 6A) and one where the background has become occluded by a foreground object (FIG. 6B).

As shown, the method 500 begins at step 505 where the SIC detection component determines intensity differences between a current pixel (pixel X) and a set of neighboring pixels in the raw image, i.e., in a current video frame. At step 510, the SIC detection component may determine intensity differences between a pixel in the background image (corresponding to the current pixel (pixel (X) in the raw image)) and a set of neighboring pixels in the background image. For example, FIG. 6A shows a legend 600 illustrating an example of a current pixel (pixel X) and eight neighboring pixels (labeled $N_1$-$N_8$). Additionally, FIG. 6A shows a 3×3 grid 610 with values representing grayscale values from a raw image. In this example, the current pixel (X) in grid 610 has a value of 100 and the remaining grid elements ($N_1$-$N_8$) have the radiance values shown in the grid 610. FIG. 6A also shows a 3×3 grid 605 representing pixel values from a background image. In this example, pixel (X) in the center of grid 605 corresponds to the pixel in grid 610 having a value of 100. That is, the two pixels each depict the same location in a scene of recorded video. The pixel value of 50 represents an expected pixel radiance value obtained when the background is visible—based on the background image generated by the BG/FG component. The pixel value of 100 represents a value obtained in a raw frame of video.

Figures 6A, 6B:
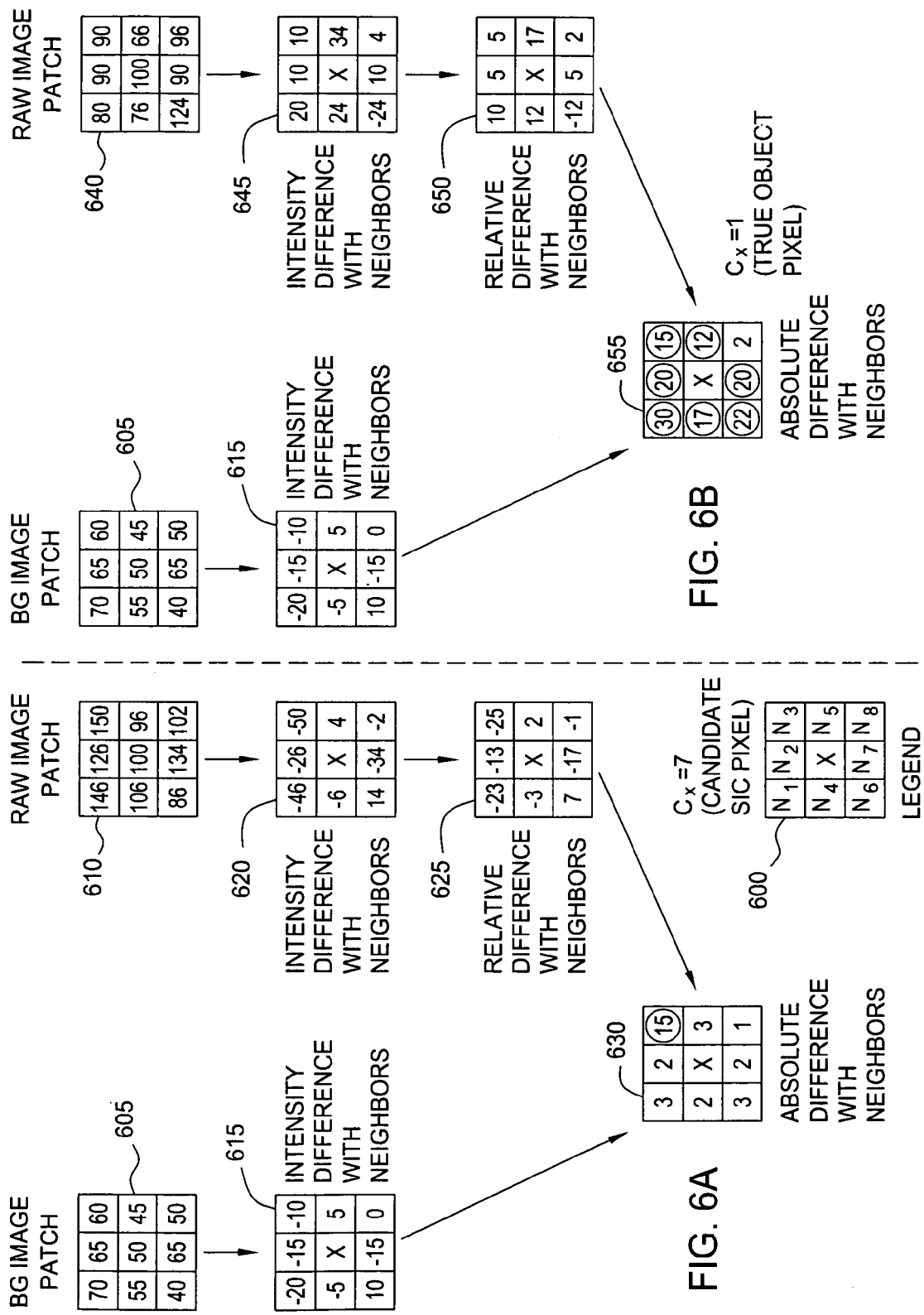
FIGS. 6A-6B illustrate examples of pixel radiance values used to detect a sudden illumination change in an image from a sequence of video frames, according to one embodiment of the invention.

Additionally, FIG. 6A shows a grid 615 and a grid 620. Grid 615 stores an intensity difference measured between pixel (X) (with a value of 50, as shown in grid 605) and each of the ($N_1$-$N_8$) pixel values. For example, the difference between pixel (X) and $N_1$ is (50–70) or (–20). The (–20) value is stored in the $N_1$ position of grid 615. Similarly, grid 620 stores an intensity difference measured between pixel (X) (with a value of 100, as shown in grid 610) and each of the ($N_1$-$N_8$) neighboring pixel values. For example, the difference between pixel X and $N_1$ is (100–146) or (–46). The (–46) value is stored in the $N_1$ position of grid 620.

Returning to the method 500 of FIG. 5, at step 515, the SIC detection component may normalize the differences in the raw images based on a relative ratio in magnitude between pixel X in the raw frame and pixel X in the background image. For example, FIG. 6A shows a grid 625 with values normalized based on the values in grid 610 and the values for pixel X of 50 in grid 605 and a value of 100 in grid 620. In this particular example, the ratio of pixel (X) in grid 610 to the value of pixel (X) in grid 605 is (100/50=2). Stated another way, the value of pixel X in grid 610 is twice (2×) the value of pixel X in grid 605. In one embodiment, the values of raw image patch (reflected in grid 610) are normalized using a ratio determined in this manner. In FIG. 6A, a grid 625 shows the ($N_1$-$N_8$) values of grid 620, after being divided by two. For example, the value for $N_1$ element of grid 625 is –23, or one-half the value of the $N_1$ element of grid 610. The other values of grid 625 are determined in the same manner.

Returning to the method 500 of FIG. 5, at step 520, once the intensity differences derived from the raw image patch are normalized, the SIC detection component may determine an absolute difference between the intensity differences for each of the ($N_1$-$N_8$) values in the background image patch (i.e., the values in grid 615) and the corresponding ($N_1$-$N_8$) normalized intensity difference values (i.e., the values in grid 625). The results of this computation are shown in grid 630. For example, the value of "3" in the $N_1$ element of grid 630 is determined as the difference of the value of –20 in the $N_1$ element of grid 615 and the value of –23 in the $N_1$ element of grid 625; namely, (–20–(–23))=3. Similarly, the $N_3$ of grid 630 value is calculated as (–10–25)=15).

Figure 7:
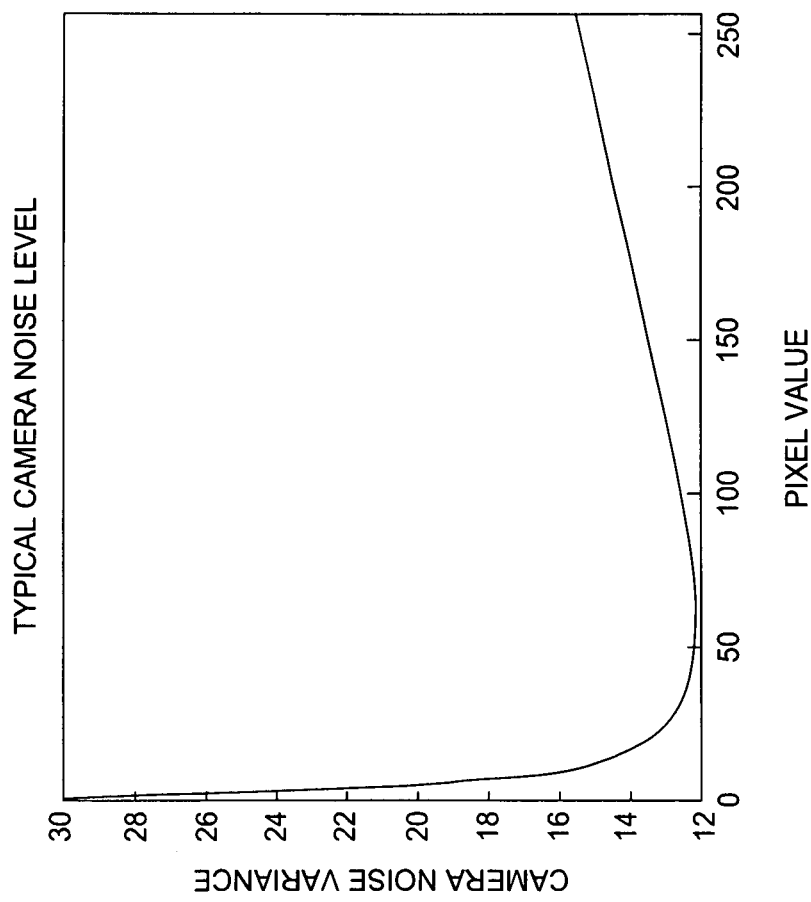
FIG. 7 is a graph representing an example of typical noise levels for a video camera, according to one embodiment of the invention.

Returning to the method 500 of FIG. 5, at step 525, the SIC detection component may evaluate grid 635 to determine how many of the neighboring pixels indicate that a sudden illumination change has occurred for pixel X. In one embodiment, the number of such pixels is determined using a threshold itself determined using an expected noise profile of the camera. For example, FIG. 7 illustrates an example noise profile for a video camera. In this example, pixel values ranging from 0-255 are plotted on the X axis, and the expected noise variance for any particular radiance value is shown on the Y axis. The noise represents an expected change in pixel values from frame to frame where no lighting or other changes in the scene occur. For example, for a pixel value of roughly 150, an expected variance of ±14 is anticipated for a given pixel from frame-to-frame. In the example of FIG. 6A, pixel X has a value of 50—and FIG. 7 indicates a pixel value of 50 has an expected variance of just slightly more than 12.0.

In one embodiment, the SIC detection component uses this information to determine a Gaussian distribution using the pixel value (e.g., 50) as a mean and the expected camera noise (e.g., ~12.2) as a variance. If the absolute difference of one of the ($N_1$-$N_8$) values is within three standard deviations (3σ) from the mean determined using these values (representing 99% of data samples in a Gaussian distribution), then that pixel is an SIC candidate. Stated another way, if the absolute difference between one of the ($N_1$-$N_8$) values in grid 625 and grid 615 exceeds three standard deviations, then the changes in the pixel are presumed to be due to an actual foreground object and not a sudden illumination change. In the example of FIG. 6A, seven of the ($N_1$-$N_8$) values are within three standard deviations, thus the candidate SIC pixel count is seven. Of course, the use of three standard deviations is used as an example, and other thresholds or techniques may be used to determine a count of candidate SIC pixels.

Compare this with the results in FIG. 6B. Illustratively, FIG. 6B includes grid 605 and 615, representing a patch of the background image (grid 605) and the intensity differences between pixel X and the neighboring ($N_1$-$N_8$) pixels (grid 615). FIG. 6B also includes a grid 640 representing a portion of a raw image. Illustratively, pixel (X) is still 100 in grid 640, but the ($N_1$-$N_8$) values are different from grid 610 of FIG. 6A. FIG. 6B also includes a grid 645 which stores an intensity difference measured between pixel (X) (with a value of 100, as shown in grid 640) and each of the ($N_1$-$N_8$) neighboring pixel values. As the ratio of pixel X in grids 605 and 640 remains at 2, the ($N_1$-$N_8$) values are normalized using the same ratio as grid 625 of FIG. 6A. This results in the values shown in grid 650 (where each of the ($N_1$-$N_8$) values are divided by 2). Further, grid 655 shows the absolute difference with the ($N_1$-$N_8$) values in the background image patch (grid 615) and the normalized ($N_1$-$N_8$) values in grid 650. As discussed relative to FIG. 6A, the value in the background image for pixel (X) is 50, which leads to a variance slightly larger than 12.0. Using these values to construct an expected Gaussian distribution, three standard deviations is roughly 10.48. Further, only one of the ($N_1$-$N_8$) values is within this value (in particular, the pixel value at $N_8$); the other ($N_1$-$N_8$) values exceed three standard deviations. Accordingly, in this example, the SIC detection component may conclude that pixel (X) in grid 640 depicts an actual foreground object (and is not the result of a sudden illumination change).

Returning to the method 500 of FIG. 5, at step 525, the SIC detection component may determine whether the SIC candidate count is above a specified threshold. In one embodiment, this threshold may be seven. That is, at least seven of the ($N_1$-$N_8$) values must be within three standard deviations determined using the value for Pixel X and noise variance of the camera in order for the pixel to be labeled as an SIC candidate pixel. If the SIC candidate count is above the threshold, then at step 530, the status of pixel (X) is set to being a candidate SIC pixel. Otherwise, at step 535, if the SIC candidate count is below another specified threshold, then the status of pixel (X) is set to being a true foreground object pixel (step 540). In one embodiment, this threshold may be two. That is, no more than two of the ($N_1$-$N_8$) may fall within three standard deviations determined in order for the pixel to be labeled as a true foreground object pixel.

As discussed above, in the example of FIG. 6A, the candidate (SIC) pixel count from grid 630 is seven. Thus, in this example, at steps 525 and 530, pixel X is labeled as a candidate SIC pixel. In contrast, in the example of FIG. 6B, the candidate (SIC) pixel count from grid 655 is one. Thus, in this example, at steps 535 and 540, pixel X is labeled as a true foreground object. Of course, like the threshold to label a pixel as an SIC candidate pixel, the threshold used to label a pixel as a true foreground object may be set as a matter of experience and the needs of a particular case. However, as suggested, in one embodiment, the thresholds may be set to 7 and 2, respectively. Of course, this may result in some pixels not being labeled as either an SIC candidate pixel or a true foreground object pixel. In one embodiment, if it is indeterminate whether the pixel depicts an actual foreground object or has changed as the result of a sudden illumination change, then the pixel may be left as foreground for determining whether a foreground object (which includes that pixel) is classified as being foreground as part of the method of FIG. 4.

However, alternatively, a hierarchical approach may be used to determine whether to label a given pixel as a true foreground object or a candidate SIC pixel. For example, as shown in FIG. 5, at step 545, the SIC detection component may reduce the resolution of the raw image, the background image, and the foreground blobs derived from the raw image to a lower resolution. In such a case, the height and width of the original images may be integer multiples of the reduced images. For example, a bilinear interpolation approach may be used to reduce the raw image and a simple voting method may be used to reduce the binary foreground blob. Of course, a variety of other techniques to lower the image resolutions may be used as well.

Once the resolution is reduced, the SIC detection methods described above may be used to evaluate a pixel (X) (with indeterminate results at higher resolution) using the lower resolution images. In such a case, by reducing the resolution, the pixel may end up being labeled as being a true foreground object or a candidate SIC pixel.

Advantageously, as described herein, embodiments of the invention may be used as part of a computer vision engine to detect sudden illumination changes occurring in a sequence of video frames. As described above, a background/foreground (BG/FG) component of a behavior recognition system may be configured to generate a background image depicting a scene background. Further, the (BG/FG) component may periodically evaluate a current video frame to determine whether a sudden illumination change has occurred. A sudden illumination change occurs when scene lighting changes dramatically from one frame to the next (or over a small number of frames).

In one embodiment, sudden illumination changes may be detected using radiance consistency within a spatial neighborhood. That is, to determine whether a given pixel value in an image of video has undergone a sudden illumination change, the radiance values of pixels neighboring the given pixel are evaluated. The (BG/FG) component may evaluate the background image and foreground blobs derived from a current video frame to determine whether a sudden illumination change has occurred. If a majority of pixels of a foreground blob indicate that a sudden illumination change has occurred, such pixels may be classified as depicting background of the scene (and not scene foreground). Further, such pixels may be used to update the background image so that the pixel values in the background model reflect the sudden illumination change.

While the foregoing is directed to embodiments of the present invention, other and further embodiments of the invention may be devised without departing from the basic scope thereof, and the scope thereof is determined by the claims that follow.

What is claimed is:

1. A computer-implemented method for detecting a sudden illumination change (SIC) in a sequence of video frames, comprising:

receiving a current video frame, of the sequence of video frames;

identifying one or more sets of pixels in the current video frame, wherein each set of pixels is classified as depicting a foreground object;

for each pixel in at least a first one of the sets of pixels:
identifying a radiance value for the pixel and for each pixel within a spatial neighborhood of the pixel, and
determining, for the pixel, whether the radiance values for the pixel and the pixels in the spatial neighborhood indicate that a sudden illumination change has occurred in a scene depicted by the sequence of video frames; and upon determining that a majority of pixels in the first set of pixels indicate that a sudden illumination change has occurred, reclassifying one or more pixels in the first set of pixels as depicting a background of the scene in the current frame, wherein the reclassified pixels were classified as depicting scene background in one or more frames prior to the current frame.

2. The computer-implemented method of claim 1, further comprising:
updating a set of pixels in a background image of the scene corresponding to the pixels in the first set of pixels.

3. The computer-implemented method of claim 1, wherein the spatial neighborhood for a given pixel comprises a 3×3 grid of pixels radiance values with a radiance value given pixel in the center of the 3×3 grid.

4. The computer-implemented method of claim 1, wherein determining, for the pixel, whether the radiance values for the pixel and the pixels in the spatial neighborhood indicate that a sudden illumination change has occurred, comprises:
identifying, in a background image, a pixel corresponding to the pixel in the current video frame;
determining an intensity difference between the corresponding pixel and each pixel in a spatial neighborhood of the corresponding pixel;
determining an intensity difference between the pixel and each pixel in the spatial neighborhood of the pixel in the current video frame;
normalizing the intensity differences determined between the pixel and each pixel in the spatial neighborhood of the pixel in the current video frame;
determining an absolute difference between each respective pixel in the spatial neighborhood of the pixel in the current video frame and each respective pixel in the spatial neighborhood of the corresponding pixel;
for each pixel in the spatial neighborhood of the pixel in the current video frame, determining whether the absolute difference is below a first specified threshold, and
if so, incrementing a counter representing how many pixels in the spatial neighborhood are below the first specified threshold;
upon determining the counter exceeds a second threshold, setting a status of the pixel as being an SIC candidate pixel, indicating that the pixel was classified as depicting a scene foreground object due to a sudden illumination change in the scene depicted by the sequence of video frames.

5. The computer-implemented method of claim 4, further comprising:
upon determining a count of pixels classified as depicting the foreground object which have a status of SIC candidate pixel is below a third threshold, setting a status of the foreground object as being a true foreground object, the status indicating that a sudden illumination change has not occurred for the pixels classified as depicting the foreground in the scene depicted by the sequence of video frames; and upon determining a count of pixels classified as depicting the foreground object which have a status of SIC candidate pixel is above a fourth threshold, setting a status of the foreground object blob as being an SIC foreground object, the status indicating that a sudden illumination change has occurred for that foreground object in the scene in the current video frame.

6. The computer-implemented method of claim 4, further comprising:
generating a lower-resolution image of the current video frame; and
repeating the computer-implemented method for detecting a sudden illumination change (SIC) in a sequence of video frames recited by claim 1, using the lower resolution image as the current frame of video.

7. The computer-implemented method of claim 4, wherein normalizing the intensity differences comprises, dividing each of the intensity differences determined between the pixel and each pixel in the spatial neighborhood of the pixel in the current video frame using a ratio of the radiance value of the pixel in the current video frame and a radiance value of the corresponding pixel in the background image.

8. The computer-implemented method of claim 4, wherein the first specified threshold is determined using a Gaussian distribution determined using the pixel radiance value as a mean and an expected camera noise at the pixel radiance value as a variance.

9. The computer-implemented method of claim 8, wherein the first specified threshold is three standard deviations from the mean.

10. The computer-implemented method of claim 1, wherein each radiance value provides a grayscale value between 0 and 255.

11. A non-transitory computer-readable storage medium containing a program which, when executed by a processor, performs an operation for detecting a sudden illumination change (SIC) in a sequence of video frames, the operation comprising:
receiving a current video frame, of the sequence of video frames;
identifying one or more sets of pixels in the current video frame, wherein each set of pixels is classified as depicting a foreground object;
for each pixel in at least a first one of the sets of pixels:
identifying a radiance value for the pixel and for each pixel within a spatial neighborhood of the pixel, and
determining, for the pixel, whether the radiance values for the pixel and the pixels in the spatial neighborhood indicate that a sudden illumination change has occurred in a scene depicted by the sequence of video frames; and
upon determining that a majority of pixels in the first set of pixels indicate that a sudden illumination change has occurred, reclassifying one or more pixels in the first set of pixels as depicting a background of the scene in the current frame, wherein the reclassified pixels were classified as depicting scene background in one or more frames prior to the current frame.

12. The non-transitory computer-readable storage medium of claim 11, wherein the operation further comprises:
updating a set of pixels in a background image of the scene corresponding to the pixels in the first set of pixels.

13. The non-transitory computer-readable storage medium of claim 11, wherein the spatial neighborhood for a given pixel comprises a 3×3 grid of pixels radiance values with a radiance value given pixel in the center of the 3×3 grid.

14. The non-transitory computer-readable storage medium of claim 11, wherein determining, for the pixel, whether the radiance values for the pixel and the pixels in the spatial neighborhood indicate that a sudden illumination change has occurred, comprises:
- identifying, in a background image, a pixel corresponding to the pixel in the current video frame;
- determining an intensity difference between the corresponding pixel and each pixel in a spatial neighborhood of the corresponding pixel;
- determining an intensity difference between the pixel and each pixel in the spatial neighborhood of the pixel in the current video frame;
- normalizing the intensity differences determined between the pixel and each pixel in the spatial neighborhood of the pixel in the current video frame;
- determining an absolute difference between each respective pixel in the spatial neighborhood of the pixel in the current video frame and each respective pixel in the spatial neighborhood of the corresponding pixel;
- for each pixel in the spatial neighborhood of the pixel in the current video frame, determining whether the absolute difference is below a first specified threshold, and
- if so, incrementing a counter representing how many pixels in the spatial neighborhood are below the first specified threshold;
- upon determining the counter exceeds a second threshold, setting a status of the pixel as being an SIC candidate pixel, indicating that the pixel was classified as depicting a scene foreground object due to a sudden illumination change in the scene depicted by the sequence of video frames.

15. The non-transitory computer-readable storage medium of claim 14, wherein the operation further comprises:
- upon determining a count of pixels classified as depicting the foreground object which have a status of SIC candidate pixel is below a third threshold, setting a status of the foreground object as being a true foreground object, the status indicating that a sudden illumination change has not occurred for the pixels classified as depicting the foreground in the scene depicted by the sequence of video frames; and
- upon determining a count of pixels classified as depicting the foreground object which have a status of SIC candidate pixel is above a fourth threshold, setting a status of the foreground object blob as being an SIC foreground object, the status indicating that a sudden illumination change has occurred for that foreground object in the scene in the current video frame.

16. The non-transitory computer-readable storage medium of claim 14, wherein normalizing the intensity differences comprises, dividing each of the intensity differences determined between the pixel and each pixel in the spatial neighborhood of the pixel in the current video frame using a ratio of the radiance value of the pixel in the current video frame and a radiance value of the corresponding pixel in the background image.

17. The non-transitory computer-readable storage medium of claim 14, wherein the first specified threshold is determined using a Gaussian distribution determined using the pixel radiance value as a mean and an expected camera noise at the pixel radiance value as a variance.

18. The non-transitory computer-readable storage medium of claim 17, wherein the first specified threshold is three standard deviations from the mean.

19. A system comprising,
- a video input source configured to provide a sequence of video frames, each depicting a scene;
- a processor; and a memory containing a program, which, when executed on the processor is configured to perform an operation for detecting a sudden illumination change (SIC) in a sequence of video frames by performing the steps of:
- receiving a current video frame, of the sequence of video frames,
- identifying one or more sets of pixels in the current video frame, wherein each set of pixels is classified as depicting a foreground object,
- for each pixel in at least a first one of the sets of pixels:
- identifying a radiance value for the pixel and for each pixel within a spatial neighborhood of the pixel, and
- determining, for the pixel, whether the radiance values for the pixel and the pixels in the spatial neighborhood indicate that a sudden illumination change has occurred in a scene depicted by the sequence of video frames; and
- upon determining that a majority of pixels in the first set of pixels indicate that a sudden illumination change has occurred, reclassifying one or more pixels in the first set of pixels as depicting a background of the scene in the current frame, wherein the reclassified pixels were classified as depicting scene background in one or more frames prior to the current frame.

20. The system of claim 19, wherein the operation further comprises:
- updating a set of pixels in a background image of the scene corresponding to the pixels in the first set of pixels.

21. The system of claim 19, wherein the spatial neighborhood for a given pixel comprises a 3×3 grid of pixels radiance values with a radiance value given pixel in the center of the 3×3 grid.

22. The system of claim 19, wherein determining, for the pixel, whether the radiance values for the pixel and the pixels in the spatial neighborhood indicate that a sudden illumination change has occurred, comprises:
- identifying, in a background image, a pixel corresponding to the pixel in the current video frame;
- determining an intensity difference between the corresponding pixel and each pixel in a spatial neighborhood of the corresponding pixel;
- determining an intensity difference between the pixel and each pixel in the spatial neighborhood of the pixel in the current video frame;
- normalizing the intensity differences determined between the pixel and each pixel in the spatial neighborhood of the pixel in the current video frame;
- determining an absolute difference between each respective pixel in the spatial neighborhood of the pixel in the current video frame and each respective pixel in the spatial neighborhood of the corresponding pixel;
- for each pixel in the spatial neighborhood of the pixel in the current video frame, determining whether the absolute difference is below a first specified threshold, and
- if so, incrementing a counter representing how many pixels in the spatial neighborhood are below the first specified threshold;
- upon determining the counter exceeds a second threshold, setting a status of the pixel as being an SIC candidate pixel, indicating that the pixel was classified as depicting a scene foreground object due to a sudden illumination change in the scene depicted by the sequence of video frames.

23. The system of claim 22, wherein the operation further comprises:
- upon determining a count of pixels classified as depicting the foreground object which have a status of SIC candidate pixel is below a third threshold, setting a status of the foreground object as being a true foreground object, the status indicating that a sudden illumination change has not occurred for the pixels classified as depicting the foreground in the scene depicted by the sequence of video frames; and upon determining a count of pixels classified as depicting the foreground object which have a status of SIC candidate pixel is above a fourth threshold, setting a status of the foreground object blob as being an SIC foreground object, the status indicating that a sudden illumination change has occurred for that foreground object in the scene in the current video frame.

24. The system of claim 22, wherein normalizing the intensity differences comprises, dividing each of the intensity differences determined between the pixel and each pixel in the spatial neighborhood of the pixel in the current video frame using a ratio of the radiance value of the pixel in the current video frame and a radiance value of the corresponding pixel in the background image.

25. The system of claim 22, wherein the first specified threshold is determined using a Gaussian distribution determined using the pixel radiance value as a mean and an expected camera noise at the pixel radiance value as a variance.

* * * * *